United States Patent
Hebb et al.

(10) Patent No.: US 6,463,067 B1
(45) Date of Patent: Oct. 8, 2002

(54) SUBMISSION AND RESPONSE ARCHITECTURE FOR ROUTE LOOKUP AND PACKET CLASSIFICATION REQUESTS

(75) Inventors: Andrew T. Hebb, Hudson, MA (US); Sanjay G. Cherian, Brookline, NH (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 09/460,299

(22) Filed: Dec. 13, 1999

(51) Int. Cl.[7] .......................... H04L 12/28; H04L 12/56
(52) U.S. Cl. .................. 370/413; 370/395.31; 370/356
(58) Field of Search .................. 370/413, 351, 370/352, 353, 356, 359, 392, 395.2, 397, 399, 412, 415, 417, 419, 428, 429, 360, 395.31, 395.32, 423; 709/238, 240, 229, 235

(56) References Cited

U.S. PATENT DOCUMENTS

| | | | | |
|---|---|---|---|---|
| 5,905,723 A | * | 5/1999 | Varghese et al. | 370/351 |
| 5,918,074 A | * | 6/1999 | Wright et al. | 710/52 |
| 6,069,895 A | * | 5/2000 | Ayandeh | 370/399 |
| 6,081,522 A | * | 6/2000 | Hendel et al. | 370/389 |
| 6,160,811 A | * | 12/2000 | Partridge et al. | 370/401 |
| 6,192,051 B1 | * | 2/2001 | Lipman et al. | 370/389 |
| 6,259,699 B1 | * | 7/2001 | Opalka et al. | 370/398 |
| 6,266,706 B1 | * | 7/2001 | Brodnik et al. | 709/242 |
| 6,285,679 B1 | * | 9/2001 | Dally et al. | 370/413 |

* cited by examiner

*Primary Examiner*—Douglas Olms
*Assistant Examiner*—Phirin Sam
(74) *Attorney, Agent, or Firm*—Troutman Sanders LLP (57) ABSTRACT

Packet processing logic includes a request queue for receiving lookup requests from a packet processor, where each request includes information elements from a received packet and indicates that a route lookup and a packet classification are to be performed based on the information elements. Both a route lookup engine (RLE) and a packet classification engine (PCE) have respective inputs coupled to the request queue for receiving selected information elements from the requests. Based on the information elements in each request, the RLE searches for forwarding information indicating how the packet corresponding to the request should be forwarded, and the PCE performs a classification process and generates classification information about the packet corresponding to the request. For each request, the forwarding information from the RLE and the classification information from the PCE are combined into a single result stored in a result queue. Each result is provided to the packet processor in a single communication transaction therewith.

13 Claims, 8 Drawing Sheets

| Word | 63 | 62 | 61 | 60  56 | 55  48 | 47  40 | 39  32 | 31  16 | 15  0 |
|---|---|---|---|---|---|---|---|---|---|
| 0 | Type (1) | Ind. (1) | Res. (1) | Order (5) | RLE Ptr. (24) ||| PCE Root 0 (16) | PCE Root 1 (16) |
| 1 | 0 | Req. ID (7) ||| IP TOS (8) | IP Protocol (8) | TCP Flags (8) | IP Source Address (32) ||
| 2 | IP Destination Address (32) |||||||  TCP/UDP Source Port (16) | TCP/UDP Destination Port (16) |
| 3 | Reserved (64) |||||||||

*Fig. 6*

| 63 | 62  56 | 55 | 54 | 53 | 52 | 51  48 | 47 | 46  38 | 37  24 | 23  16 | 15  0 |
|---|---|---|---|---|---|---|---|---|---|---|---|
| T (1) | Req. ID (7) | P (1) | I (1) | L (1) | E (1) | Z (4) | R1-M (1) | Depth (9) | PCE match address (14) | RLE flags (8) | RLE Next Hop Pointer (16) |

*Fig. 7*

| 63 | 62  59 | 58  54 | 53  49 | 48  44 | 43  38 | |
|---|---|---|---|---|---|---|
| T (1) | Zero | TX message | RCE results | RCE request | Tx-D | |

| 37  32 | 31  24 | 23  18 | 17  12 | 11  6 | 5  0 |
|---|---|---|---|---|---|
| Tx-1 | Zero | Hi-0 | Hi-1 | Lo-0 | Lo-1 |

SUBMISSION AND RESPONSE ARCHITECTURE FOR ROUTE LOOKUP AND PACKET CLASSIFICATION REQUESTS

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communication networks.

In data communication networks, network devices such as switches are used to route packets through the network. Each switch typically has a number of line interfaces, each connected to a different network segment. When a packet is received at a given line interface, forwarding logic determines which line interface the packet should be transmitted from, and the packet is transferred to the appropriate outgoing line interface to be sent toward its destination in the network.

It is known to employ specialized forwarding logic in conjunction with a microprocessor on the line interface. The microprocessor is responsible for overall packet processing and forwarding. The forwarding logic stores one or more forwarding tables in high-speed memory. The forwarding tables contain information indicating how packets should be forwarded, typically based on a destination address contained within the packet. The forwarding tables are maintained by a background process executing in the switch. When a packet is received at a line interface, the microprocessor generates a lookup request containing selected information from the packet, and issues the lookup request to the forwarding logic. The forwarding logic carries out a specialized search of one or more forwarding tables, and returns a lookup result to the microprocessor. The lookup result contains an indication of whether forwarding information has been found, and if so then it contains the forwarding information itself. The microprocessor uses the forwarding information to forward the packet. This architecture is used to achieve packet forwarding rates greater than what is achievable using a microprocessor alone.

It is also known to perform packet filtering in network devices such as switches. Packet filtering can be used to achieve various network management goals, such as traffic monitoring and security goals. Filtering criteria are established by network administrators, and provided to the switches or other devices that carry out the filtering operation. Packets received by the switches are examined to determine whether their characteristics match the criteria for any of the established filters. For packets that satisfy the criteria for one or more filters, predetermined actions associated with those filters are carried out. For example, under certain circumstances it may be desirable that packets originating from a given network node be discarded rather than being forwarded in the network. A filter can be defined in which the criterion is that a packet source address exactly match a specific value, which is the address of the node whose packets are to be discarded. The action associated with the filter is the discarding of the packet. When a packet is received whose source address satisfies this criterion, it is discarded rather than being forwarded in the normal fashion.

There are a number of different kinds of criteria that may be used to filter packets. These criteria include exact matches as well as range checking, i.e., checking whether a value in a packet falls in some range of values. Numerous packet parameters can be used as criteria, such as source address, destination address, port identifiers, type of service, and others. To be useful, packet filtering processes must allow filters to be flexibly defined using different combinations of these and other criteria.

Because of this complexity inherent in packet filtering, it has traditionally been performed largely or exclusively in software within switches or other network devices supporting packet filtering. Software-based filtering, however, presents a bottleneck when high packet forwarding performance is required. Network administrators have had to make undesirable tradeoffs between network responsiveness and network security, for example, because previous systems have not been capable of robust packet filtering at line rates.

BRIEF SUMMARY OF THE INVENTION

In accordance with the present invention, packet processing logic in a network device is disclosed that provides high-speed forwarding searching along with packet classification for packet filtering purposes. A novel request and response architecture is used between a packet-processing microprocessor and dedicated searching and classification logic to avoid communications bottlenecks that might otherwise reduce forwarding performance.

The packet processing logic includes a request queue for receiving lookup requests from a packet processor, where each request includes various information elements from a received packet, and each request indicates that both a route lookup and a packet classification are to be performed based on the information elements contained in the request. A route lookup engine (RLE) has an input coupled to the request queue for receiving selected information elements from the requests. Similarly, a packet classification engine (PCE) has an input coupled to the request queue. Based on the information elements in each request, the RLE searches for forwarding information indicating how the packet corresponding to the request should be forwarded, and the PCE performs a classification process and generates classification information about the packet corresponding to the request. For each request, the forwarding information from the RLE and the classification information from the PCE are combined into a single result stored in a result queue. Each result is provided to the packet processor in a single communication transaction therewith.

This shared request and result architecture enhances the efficiency and speed of communication between the packet processor and the PCE and RLE, allowing for high-speed packet forwarding and classification.

Other aspects, features, and advantages of the present invention are disclosed in the detailed description that follows.

DETAILED DESCRIPTION OF THE INVENTION

Figure 1:
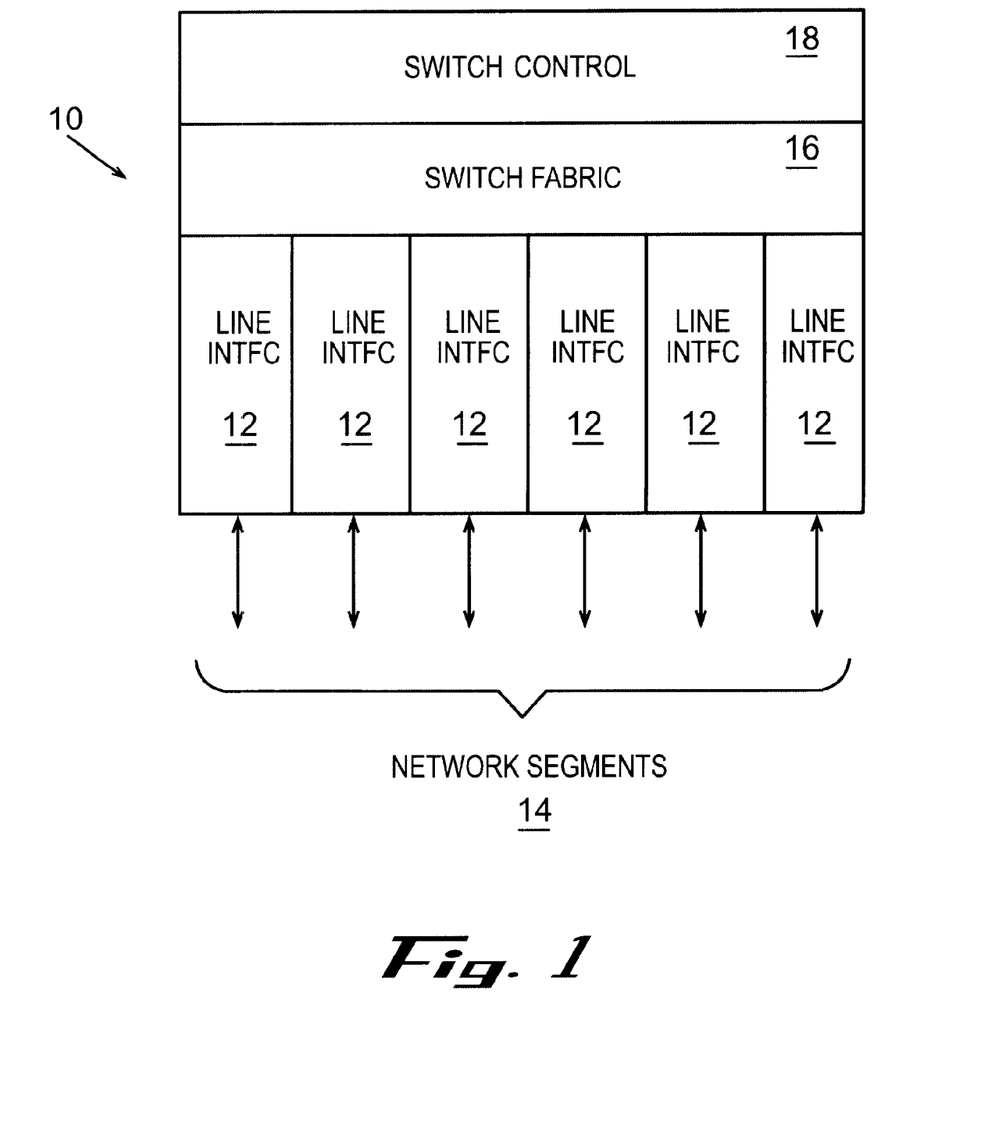
FIG. 1 is a block diagram of a network switch incorporating a packet classification engine in accordance with the present invention.

In FIG. 1, a network switch 10 is shown as including a number of line interfaces 12 connected to respective network segments 14. The line interfaces 12 are connected to a switch fabric 16 used to provide connections among the line interfaces 12 for packet forwarding. The overall operation of the switch 10, including the dynamic configuration of the switch fabric 16, is controlled by a switch control 18. In general, the various network segments 14 may be of different types. For example, certain of the network segments 14 may be optical links operating at any of a variety of standard signalling rates, such as OC-3/STM-1 and OC-12/STM-4. Others of the network segments 14 may be non-optical links employing coaxial cable, for example, and carrying signals of different formats.

Each line interface 12 is of course designed for operation with the specific type of network segment 14 to which it connects. The primary tasks of each line interface 12 are to transfer packets or frames received from an attached network segment 14 to another line interface 12 via the switch fabric 16 for forwarding on a network segment 14 attached to the other line interface 12, and to receive packets from the other line interfaces 12 via the switch fabric 16 for forwarding on the attached network segment 14.

Figure 2:
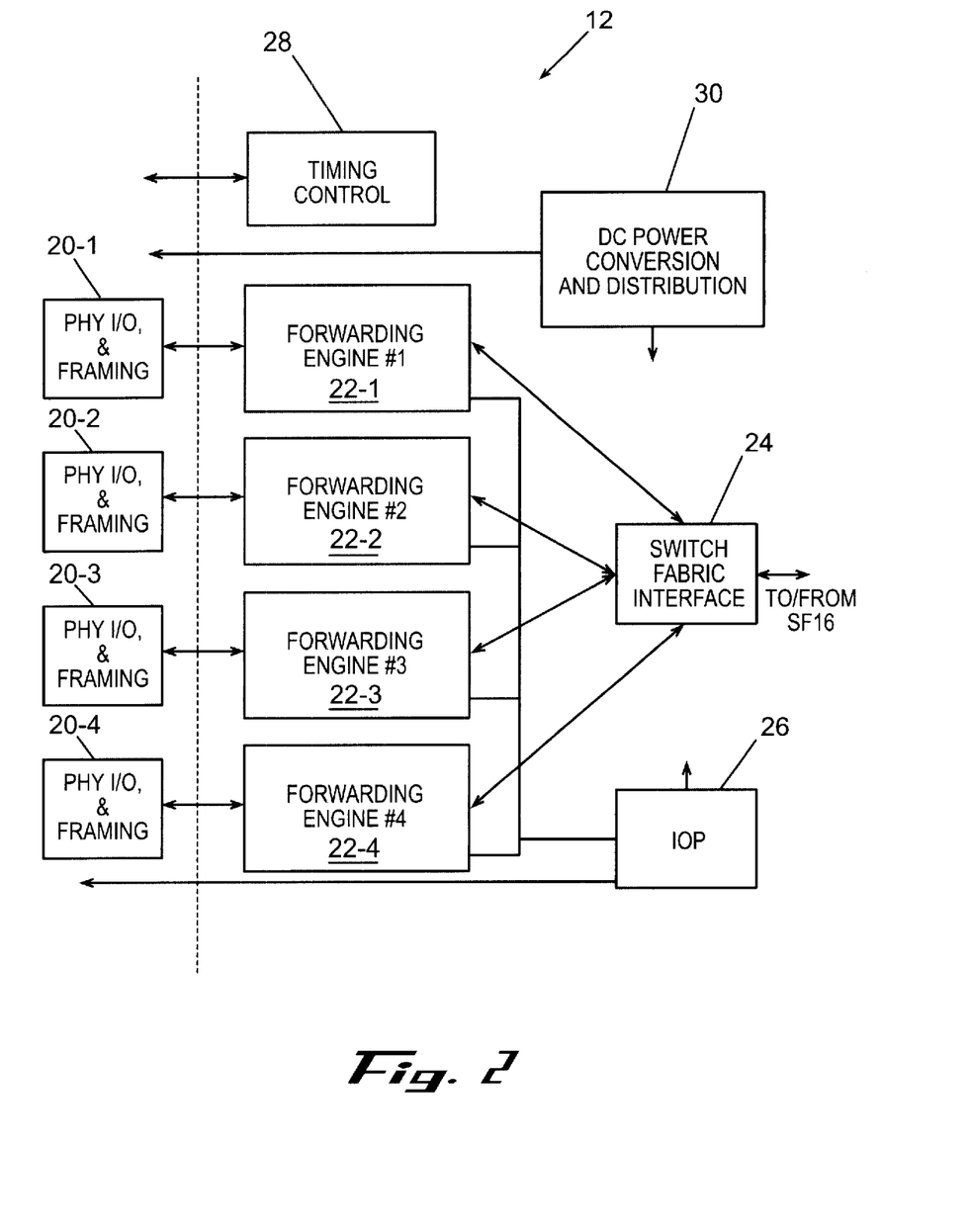
FIG. 2 is a block diagram of a line interface in the network switch of FIG. 1.

FIG. 2 shows the structure of one type of line interface 12. This interface contains four separate optical interface ports, each including physical input/output and framing circuitry 20 and a forwarding engine 22. The forwarding engines 22 are all connected to switch fabric interface logic 24, which interfaces with the switch fabric 16 of FIG. 1. The forwarding engines also interface with a line interface I/O processor (IOP) 26. Timing control logic 28 and DC power circuitry 30 are also included.

Each forwarding engine 22 provides a bidirectional data path between a connected physical I/O block 20 and the switch fabric interface 24. Received packets are segmented into multiple fixed-size ATM-like cells for transfer through the switch fabric 16 of FIG. 1 to another line interface 12. Cells received from the switch fabric 16 via the switch fabric interface 24 are reassembled into packets for outgoing transfer to the connected physical I/O block 20.

The IOP 26 is a general-purpose processor that performs background functions, i.e. functions that support the forwarding of packets that are not carried out on a per-packet basis. One function performed by the IOP 26 is receiving packet forwarding information and packet filtering information from the switch control 18 of FIG. 1, and distributing the information to the forwarding engines 22. This process is described below.

Figure 3:
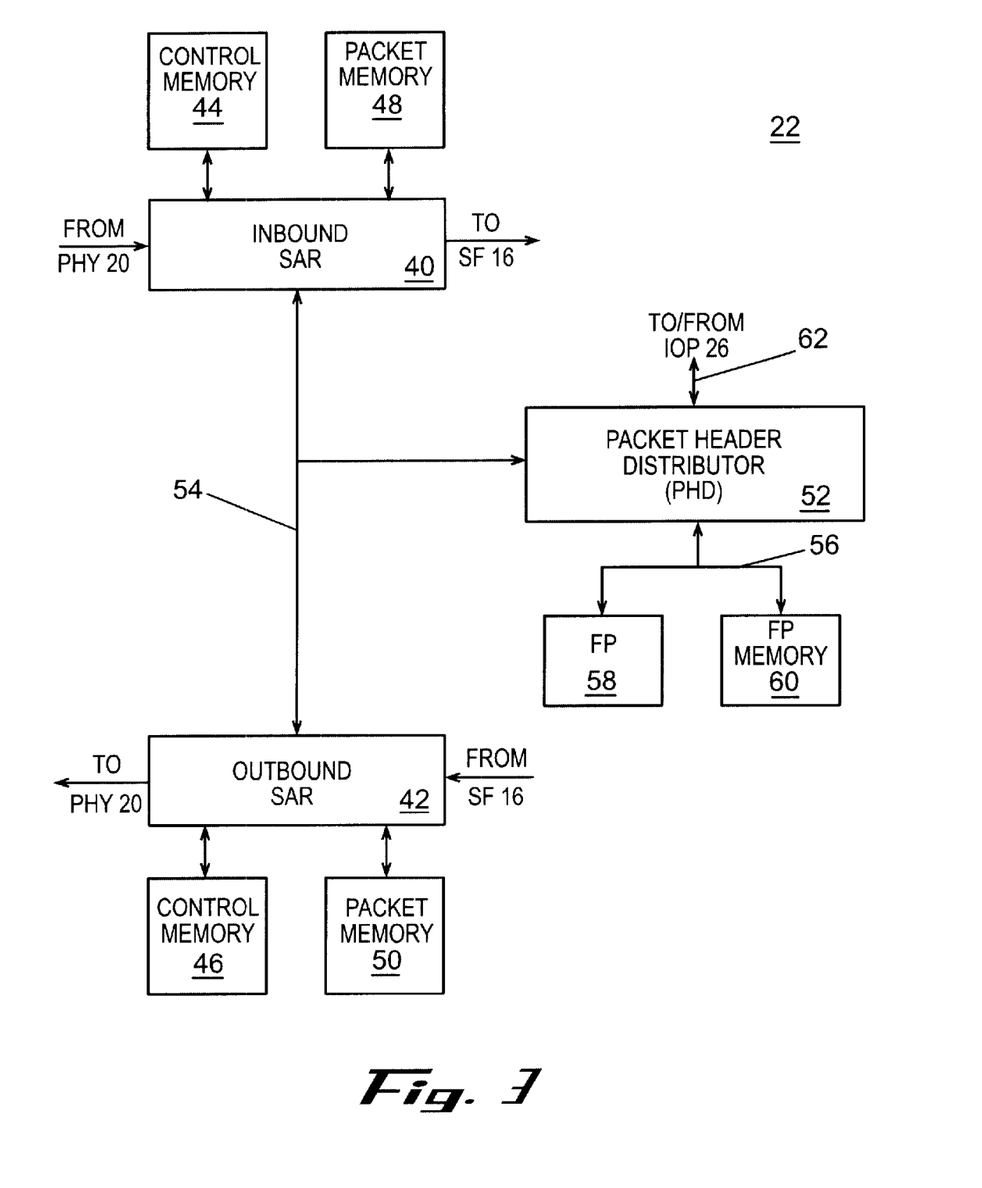
FIG. 3 is a block diagram of a packet forwarding engine on the line interface of FIG. 2.

FIG. 3 shows a block diagram of a forwarding engine 22. An inbound segmentation-and-reassembly (SAR) logic block 40 provides a data path from a physical I/O block 20 to the switch fabric 16 of FIG. 2, and an outbound SAR logic block 42 provides a data path from the switch fabric 16 to the respective physical I/O block 20. Each SAR 40, 42 is coupled to a respective control memory 44, 46 and packet memory 48, 50 used in performing the segmentation or reassembly function.

The SAR devices 40 and 42 are both connected to a packet header distributor (PHD) application-specific integrated circuit (ASIC) 52 via a 64-bit PCI bus 54. As described in more detail below, the PHD ASIC 52 provides FIFO queue interfaces between the PCI bus 54 and a separate 64-bit bus 56. The bus 56 connects the PHD ASIC 52 with a forwarding processor (FP) 58 and forwarding processor memory 60. The PHD ASIC 52 is also connected to the IOP 26 of FIG. 2 by a separate bus 62.

Figure 4:
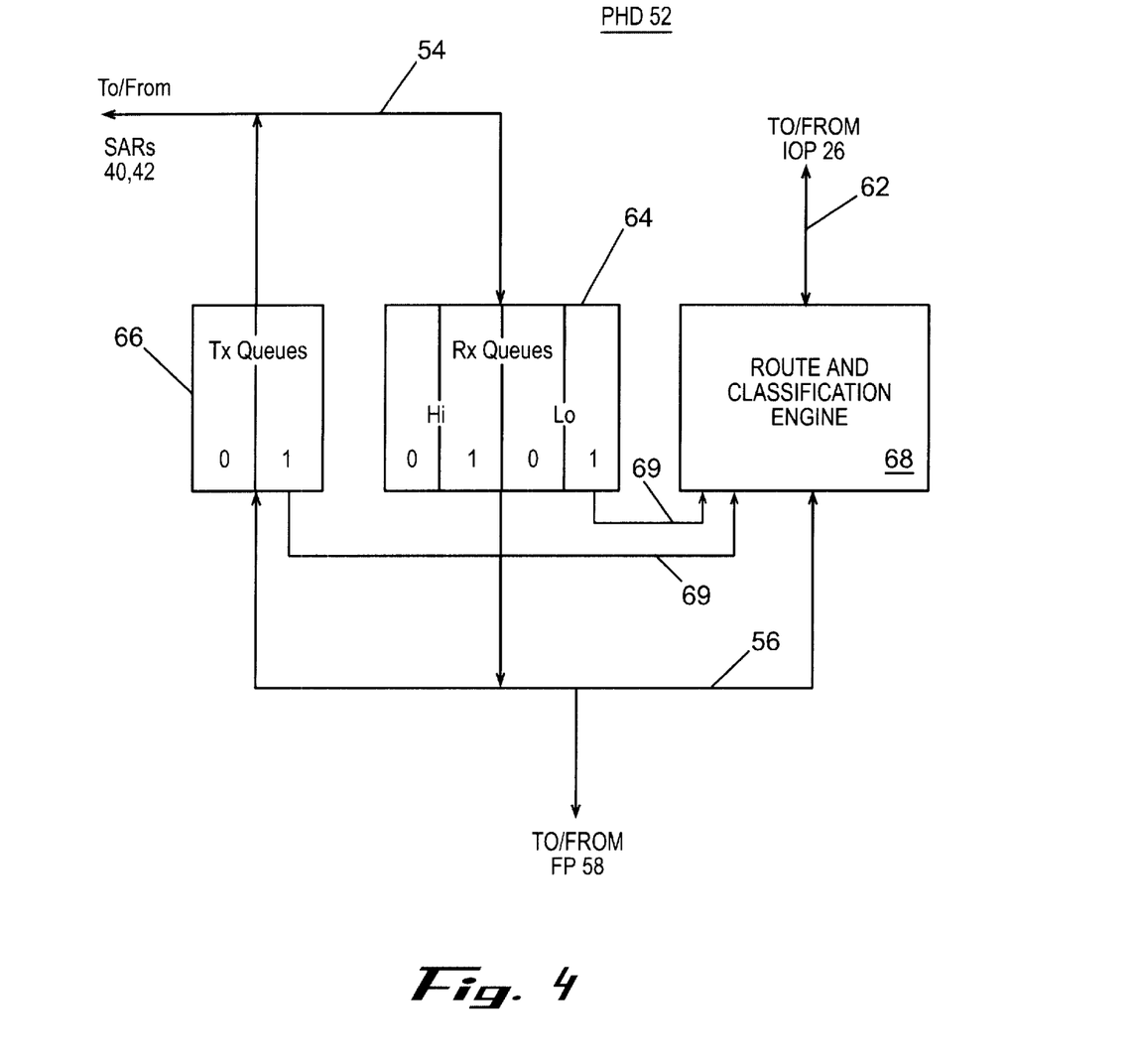
FIG. 4 is a block diagram of a packet header distributor application-specific integrated circuit (ASIC) in the forwarding engine of FIG. 3.

FIG. 4 shows the structure of the PHD 52 of FIG. 3. A set of receive queues or RX queues 64 is used for temporary buffering of packet headers and other messages bound for the FP 58. As shown, there are four RX queues 64, two queues for high-priority traffic and two queues for low-priority traffic. An example of high-priority traffic is traffic having a high Quality of Service (QOS) guarantee, such as a committed rate. Low-priority traffic is traffic having a lower QOS or no QOS guarantee, such as best-efforts. For each priority level, there is one queue (labeled "0") for traffic originating from the inbound SAR 40, and another queue (labeled "1") for traffic originating from the outbound SAR 42. A set of transmit queues or TX queues 66 is used for temporary buffering of packet headers and other messages bound for the SARs 40, 42 from the FP 58. A route and classification engine 68 performs a route lookup and various packet filtering checks on behalf of the FP 58. The packet filtering operation is described below. The route and classification engine 68 receives status information from the queues 64, 66 via signal lines 69, and makes this information available to the FP 58 in a manner described below.

The overall operation of a forwarding engine 22 will be described with reference to FIG. 3 and FIG. 4. Packets are received by the inbound SAR 40 from the associated physical-layer circuitry 20 of FIG. 2, and are stored in the packet memory 48. The inbound SAR 40 transfers the packet headers to an appropriate one of the RX queues 64 in the PHD 52. The FP 58 polls the PHD 52 to determine queue status, and retrieves the packet headers from the RX queues 64 as appropriate. As part of the header processing, the FP 58 sends certain information elements from each header to the route and classification engine 68 in a route and classification request. The route and classification engine 68 performs a route lookup and various packet filtering checks against the header elements in the request, and places the results of these checks into a result queue (described below). The FP 58 obtains the route lookup and classification results from the result queue, and uses these results to create a new header for the packet. The new header is transferred back to the PHD 52 via one of the TX queues 66, along with information identifying the internal circuit on which the packet should be forwarded after segmentation. The inbound SAR 40 retrieves the new header, places it in the packet memory 48 with the payload portion of the received packet, segments the new packet and transfers the resulting cells to the switch fabric 16 of FIG. 1 on the internal circuit specified by the FP 58.

In the outbound direction, the outbound SAR 42 receives packets from the switch fabric 16 of FIG. 1, and reassembles these packets into the packet memory 50. Packet headers are sent to the PHD 52, and retrieved from the PHD 52 by the FP 58. For most packets, the route lookup and filtering checks will have already been performed during inbound processing, so these operations are not repeated. Some protocols, however, do require lookups and filtering for both inbound and outbound packets, and therefore these operations are optionally performed by the FP 58 in conjunction with the route and classification engine 68. If appropriate, the FP 58 formulates a new header for the packet, based in part on the identity of the internal circuit on which the segmented outbound packet is received. This new header is written to the PHD 52, along with transmit circuit information. The PHD 52 transfers the new header to the outbound SAR 42. The outbound SAR 42 places the new header in the packet memory 50 along with the packet payload, and transmits the packet to the associated physical layer interface 20 of FIG. 2.

Figure 5:
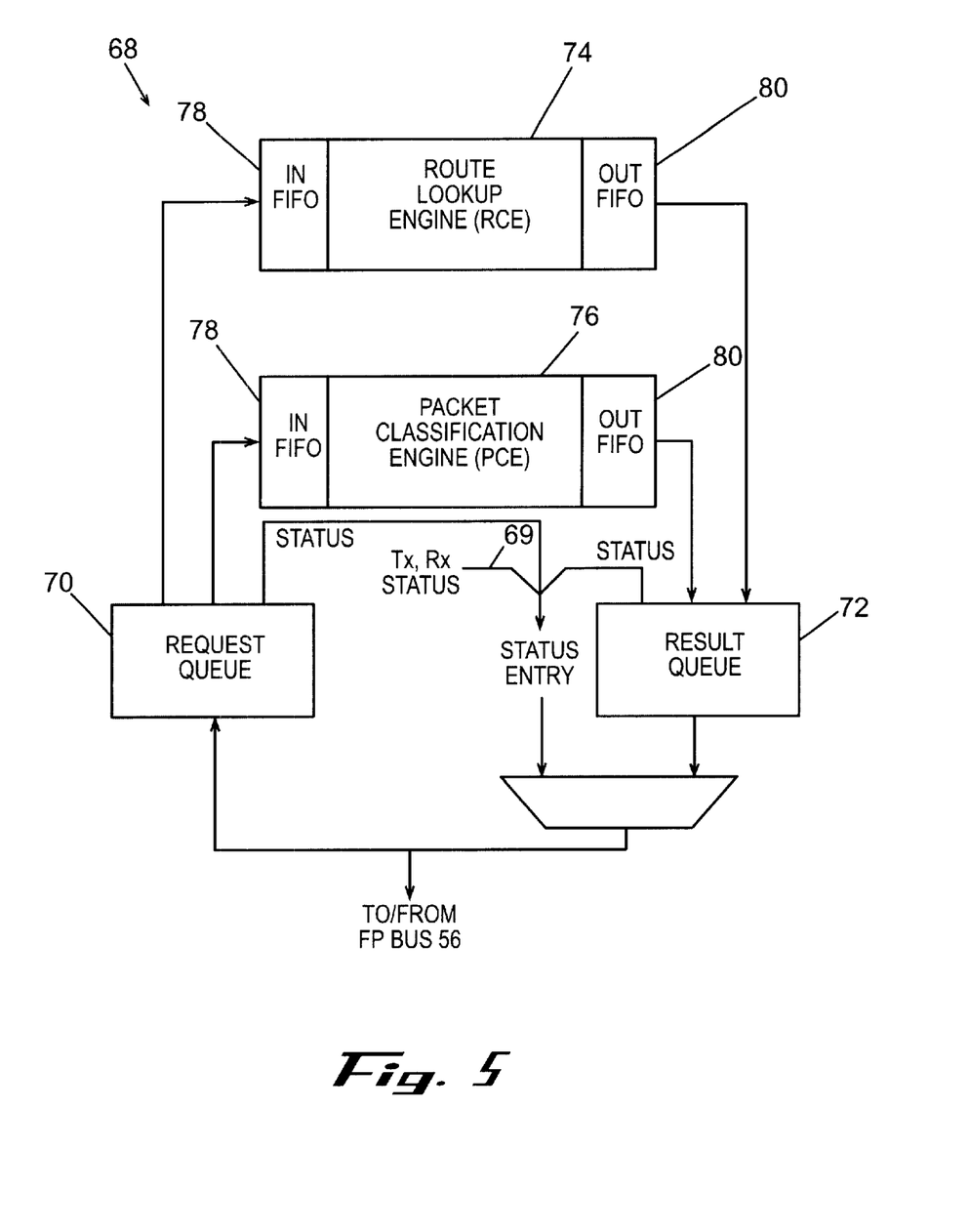
FIG. 5 is a block diagram of a route and classification engine in the packet header distributor ASIC of FIG. 4.

FIG. 5 shows the structure of the route and classification engine 68. Requests from the FP 58 of FIG. 3 are placed into a single request queue 70, and results are returned in a single result queue 72. Each queue 70 and 72 holds up to 16 request/result entries. A route lookup engine (RLE) 74 performs route lookups, typically based on a destination address (DA) included in the header. A packet classification engine (PCE) 76 performs packet filtering checks, based on specified information included in the packet header. The operation of the PCE 76 is described in more detail below. Input FIFO buffers 78 are placed between the request queue 70 and the RLE 74 and PCE 76, and output FIFO buffers 80 are placed between the RLE 74 and PCE 76 and the result queue 72. The FIFOs 78 and 80 provide a measure of decoupling between the processing performed by the RLE 74 and the processing performed by the PCE 76. A multiplexer 81 enables the FP 58 to read either the result queue 72, or status information including status from the request queue 70, the result queue 72, and the status appearing on the signal lines 69 of FIG. 4. The structure of these entries is described below.

Figure 6:
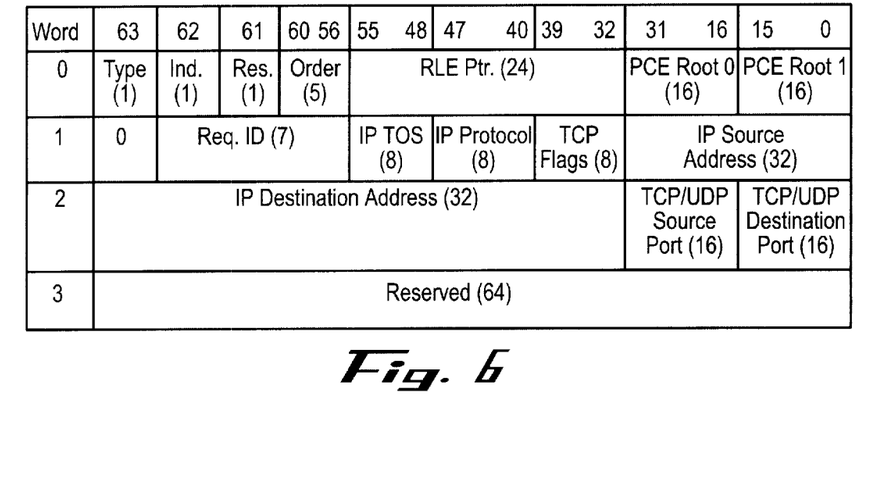
FIG. 6 is a diagram of the structure of a route and classification request passed to the route and classification engine of FIG. 5.

FIG. 6 shows the structure of the route and classification request that is passed to the PCE 76 and RLE 74 via the request queue 70 of FIG. 5. The size of the request is four 64-bit words. The various fields are defined as follows:

| FIELD NAME | DESCRIPTION |
| --- | --- |
| Type | RLE Entry type:0=Node, 1=Leaf |
| Ind. | RLE Indirect route: 1=Indirect, 0=Direct |
| Res. | Unused reserved bit |
| Order | No. of DA bits to add to RLE pointer |
| RLE Ptr. | Base address of RLE entry to which DA is added (based on Order) |
| PCE Root 0 | Starting address for PCE rule 0 |
| PCE Root 1 | Starting address for PCE rule 1 |
| 0 | Set to zero, used for alignment checking |
| Req. ID | Request identifier, copied to result to enable matching with request |
| IP TOS | The contents of the Type of Service (TOS) field of the received packet |
| IP Protocol | The contents of the Protocol field of the received packet |
| TCP Flags | The contents of the TCP Flags field of the received packet |
| IP Source Address | The IP Source Address of the received packet |
| IP Dest. Addr. | The IP Destination Address of the received packet |
| TCP/UDP Source Port | The identifier of the TCP/UDP port on which the packet was received |
| TCP/UDP Dest. Port | The identifier of the TCP/UDP port for which the received packet is destined |
| Reserved | Unused reserved bits |

As shown in the above table, there is a provision for two separate sets of classification checks, one beginning at an address labeled "PCE Root 0" and the other as "PCE Root 1".

The significance of these separate starting addresses is described below.

As previously noted, the appropriate fields of the request are provided to the respective input FIFOs 78 for the RLE 74 and PCE 76 of FIG. 5. Some of the fields, such as the Req. ID and the IP Dest. Addr., are provided to both the RLE 74 and the PCE 76. Other fields are provided to only one or the other. The use of the fields routed to the PCE in particular is described below.

Figure 7:
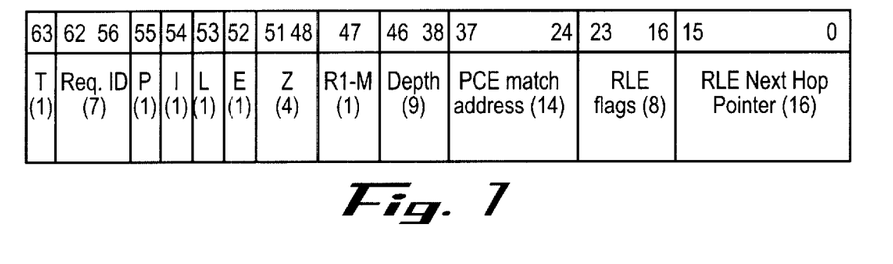
FIG. 7 is a diagram of the structure of a route and classification result provided by the route and classification engine of FIG. 5.
Figure 8:
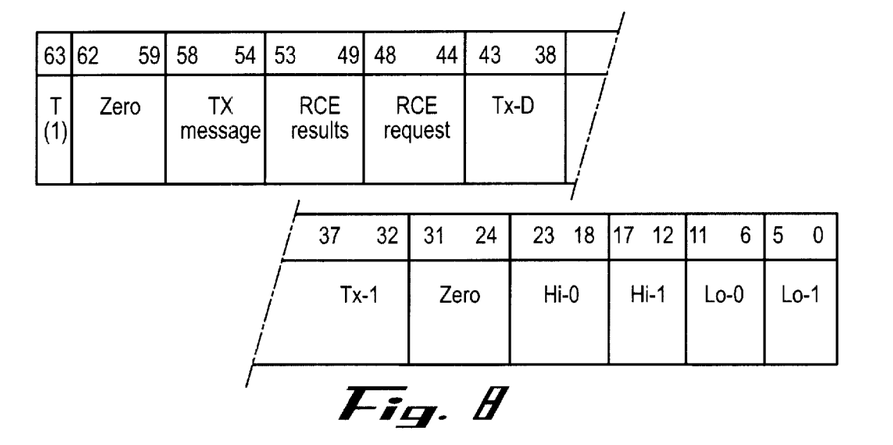
FIG. 8 is a diagram of the structure of a status indication provided by the route and classification engine of FIG. 5.

FIG. 7 and FIG. 8 show the respective structures of the two different types of entries that are read from the route and classification engine 68 of FIG. 4. FIG. 7 shows a result entry, which is obtained from the result queue 72 of FIG. 5 and conveys the result of a classification search. FIG. 8 shows a status entry used to convey status information to the FP 58 of FIG. 3.

The fields of the result entry shown in FIG. 7 are defined as follows:

| FIELD NAME | DESCRIPTION |
| --- | --- |
| T | Type: 0 = PCE Result, 1 = PCE Status |
| Req. ID | Request Identifier (from the request) |
| P | PCE Match NOT Found: 0 = Match Found, 1 = Match NOT Found |
| I | RLE Indirect Route: 0 = Normal, 1 = Indirect |
| L | RLE Long Search: 0 = Short, 1 = Long |
| E | Error indicator: 0 = Normal, 1 = Error |
| Z | Zero padding |
| R1-M | Match in PCE Root 1 (valid only if P = 0) 0 = Match in root 0, 1 = Match in root 1 |
| Depth | Depth of route lookup search |
| PCE Match Addr. | Address of last rule checked in PCE |
| RLE Flags | Flags from RLE table entry |
| RLE Next Hop Ptr. | Pointer from RLE table entry |

The fields of the status entry shown in FIG. 8 are defined as follows:

| FIELD NAME | DESCRIPTION |
| --- | --- |
| Zero | Unused, set to zero |
| TX Message | Remaining space in forwarding-processor-to-IQP message queue |
| RCE Results | Number of pending entries in result queue 72. Normally zero, because status inserted only when queue is empty. |
| RCE Requests | Number of empty entries in request queue 70 |
| Tx-0 | Number of empty entries |

-continued

| FIELD NAME | DESCRIPTION |
|---|---|
| Tx-1 | in TX queues 66. |
| Hi-0 Hi-1 Lo-0 Lo-1 | Number of empty entries in RX queues 64. |

The general operation of the route and classification engine 68 will be described with reference to FIG. 5 through FIG. 8. The FP 58 of FIG. 3 writes lookup and classification requests to the request queue 70. When a request reaches the front of the request queue 70, different information elements from the request are written simultaneously into the respective input FIFOs 78 for the RLE 74 and the PCE 76. The RLE 74 and PCE 76 operate on the separate pieces of each request independently, and in general finish their respective processing operations for a given request at different times. The results of these operations are written to the output FIFOs 80. When both sets of results for a given packet have reached the front of the output FIFOs 80, a single combined result is written to the result queue 72. The combined results are read by the FP 58 and used to formulate new packet headers and circuit information for the SARs 40 and 42 of FIG. 3, as discussed above.

More particularly, the FP 68 uses the route and classification engine 68 in a batch fashion. When there is sufficient room in the request queue 70, a burst of requests are written. Respective portions of each request are handled by the PCE 76 and RLE 74, as previously mentioned. The FP obtains results by issuing a read command to the RCE 68. For each read, a block of four 64-bit entries are returned to the FP 58 via the FP bus 56. Each block contains as many results from the result queue 72 as are available at the time of the read, and a number of status entries as padding. Thus, one of five different combinations of entries in a result block may be read:

1. 4 result entries
2. 3 result entries followed by 1 status entry
3. 2 result entries followed by 2 status entries
4. 1 result entry followed by 3 status entries
5. 4 status entries The FP 58 will generally issue read commands until the result queue 72 is empty, which is inferred whenever one or more status entries are included in the result block. The FP 58 then uses these results while the route and classification engine 68 processes the next batch of requests. The FP 58 uses the status information to manage the flow of requests, so that the RLE 74 and PCE 76 are kept busy and the queues 70 and 72 and FIFOs 78 and 80 are prevented from overflowing.

It will be noted that in the illustrated embodiment, there is only one status entry that can be read, and the multiple status entries in a result block represent multiple reads of this single entry. In alternative embodiments it may be useful to provide additional, lower-priority information in the second through fourth status entries, for example for statistics gathering purposes or other background processing.

One significant advantage of appending status information to results is improved efficiency in using the FP bus 56. Whenever the FP 58 issues a read for results, either useful results or useful status information is returned. Additionally, the result block is returned in burst fashion, so that overhead associated with reading is reduced. Also, the FP 58 obtains information about the queues around the RLE 74 and PCE 76, and about the RX queues 64 and TX queues 66, in a single read transaction.

Figure 9:
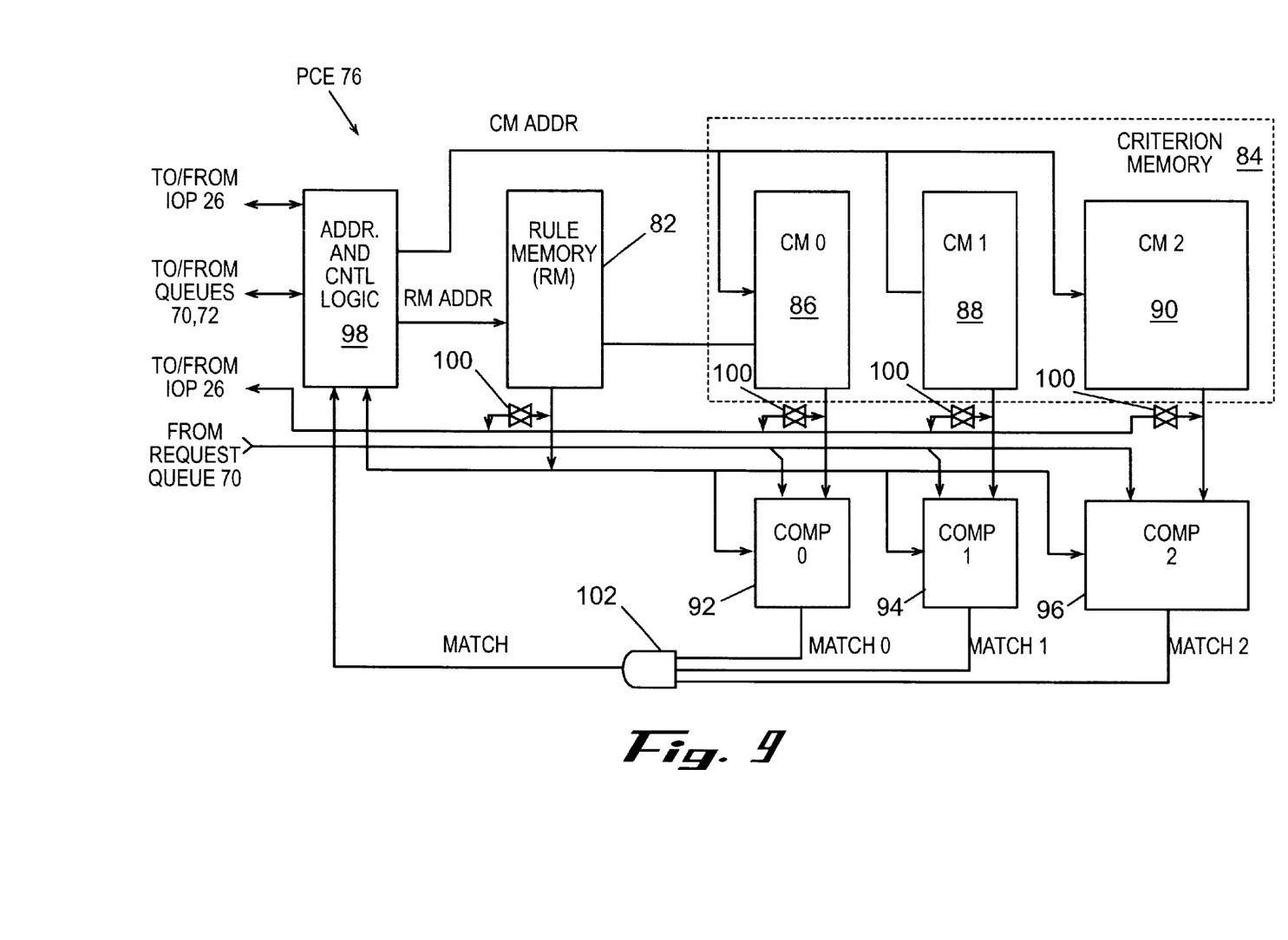
FIG. 9 is a block diagram of a packet classification engine (PCE) in the route and classification engine of FIG. 5.

FIG. 9 shows the structure of the PCE 76 of FIG. 5. Data representing filters and bindings (discussed below) are stored in a rule memory (RM) 82 and a criterion memory (CM) 84. The CM 84 includes three commonly addressed memories CM0 86, CM1 88 and CM2 90. Three comparison logic blocks 92, 94 and 96 are associated with respective ones of the criterion memories 86, 88 and 90. Addressing and control logic 98 decodes requests received from the request queue 70 of FIG. 5, generates addresses for the RM 82 and the CM 84, sequences through multiple rules as required by each request, and generates results that are passed back to the result queue 72 of FIG. 5. The addressing and control logic 98 also interfaces to the IOP 26 of FIG. 2 to enable the reading and writing of the RM 82 and CM 84 by the IOP 26. Bus transceivers 100 provide the necessary data path between the IOP 26 and the RM 82 and CM 84. An AND gate 102 provides a single MATCH signal when corresponding MATCHn outputs from the comparison logic blocks 92, 94 and 96 are all true.

Rule sets for packet filtering are typically originated by a Network Management Station (NMS), but can also be dynamically assigned by the FP 58 based on identified flows. Part or all of the following information is provided by the NMS or FP 58 for filters: IP Destination Address with mask; IP Source Address with mask; IP protocol identifier; TCP/UDP Source Port and Destination Port identifiers; IP Type of Service identifier and mask, and miscellaneous flags. The various information elements from a filter are compared with corresponding elements from each received packet in order to determine whether the packet matches the filter criteria. If so, some specific action for the filter is taken, such as intentionally discarding a packet. If not, some default action is typically taken, such as allowing the packet to proceed toward its destination.

Traditionally, packet filters are represented as an ordered list of comparison sets that are searched linearly. In the PCE 76, the filter elements are divided into criteria (the comparison values) and rules (the list itself and the operators to be used for each comparison). This separation of rules and criteria is reflected in the use of separate rule memory (RM) 82 and criterion memory (CM) 84. The memories 82 and 84 are separately optimized for their respective functions, thus enhancing efficiency and performance. Also, entries within the CM 84 can be referred to by multiple rules in the RM 82, further enhancing storage efficiency.

The RM 82 contains an array of rule memory entries, each of which may be one of two types. A first type contains a set of operators and a pointer to a row of CM 84 that stores comparands for a corresponding filter. A second type contains a pointer to another rule memory entry. These entries are used to perform jumps between non-contiguous segments in a set of rules being searched sequentially. In the illustrated embodiment, the RM 82 can contain up to 16 K entries.

The CM 84 is segmented into three separate memories CM0 86, CM1 88 and CM2 90, each of which can contain up to 4 K entries in the illustrated embodiment. The organization of the CM 84 exploits a hierarchy that is inherent in IP packet classification. Because filtering on certain fields is usually accompanied by filtering based on other fields as well, it is reasonable to restrict which fields are stored in the separate memories CM0, CM1, and CM2. These restrictions further enhance storage efficiency. The most commonly filtered fields, Source Address and Destination Address, are supported in all three memories CM0 86, CM1 88 and CM2 90. As described below, other fields are supported only in CM1 88 and/or CM2 90. This architecture maximizes the flexibility with which space in the CM 84 can be allocated, while at the same time enabling powerful parallel searches. The structure and use of CM 84 are described in more detail below.

The operation of the packet classification engine (PCE) 76 proceeds generally as follows:

1. The RM 82 and the CM 84 are initialized by the IOP 26 of FIG. 2. This happens at power-up, and during operation either by dynamic assignment or by a Network Management Station (NMS) (discussed below).
2. A packet classification request submitted by the FP 58 is retrieved from the request queue 70 of FIG. 5.
3. The RM 82 is indexed by the contents of the root 0 address of the request to retrieve the first rule memory entry of the search. If the entry is a pointer type, then this step is repeated for the rule memory address in the retrieved entry. It is possible for this step to repeat multiple times.
4. If the retrieved rule memory entry is an operator type, then a criterion memory entry is retrieved at the location specified by the CM address in the rule memory entry. Selected comparands from the CM 84 are compared with corresponding fields of the request, according to the operator in the rule memory entry. Various fields may be masked as described above.
5. The rule memory address increments by one until either an entry having a DONE bit set to one is reached, or a match condition is found (i.e. the result of the comparison operation is TRUE). A rule may have its CARRY bit set, which requires that the next rule also evaluate as TRUE before a match is declared.
6. If any rule memory entry encountered in the search is a pointer type of entry, it points to another rule memory entry rather than to a criterion memory entry. In this case, sequential rule evaluation continues beginning at the pointed-to rule memory entry.
7. The above process is performed once beginning at the root 0 address in the request. If DONE is reached for the filters associated with root 0, then the process is repeated beginning at the root 1 address. When a match is found, the result indicates whether it has been found using root 0 or root 1 rules.
8. When the search terminates, either by encountering a match or by encountering DONE in the root 1 search, a result is written back to the result queue 72 indicating the results of the filtering check. The result contains the address of the last rule checked, and whether or not a match has been found. If a match has been found, the address is used by the FP 58 to index into an action table, which initiates an action appropriate to the result. For example, if the match is for a rule indicating that all packets having a DA of less than a certain value should be dropped, then the action table points to a routine that causes the packet to be intentionally discarded.

Figure 10:
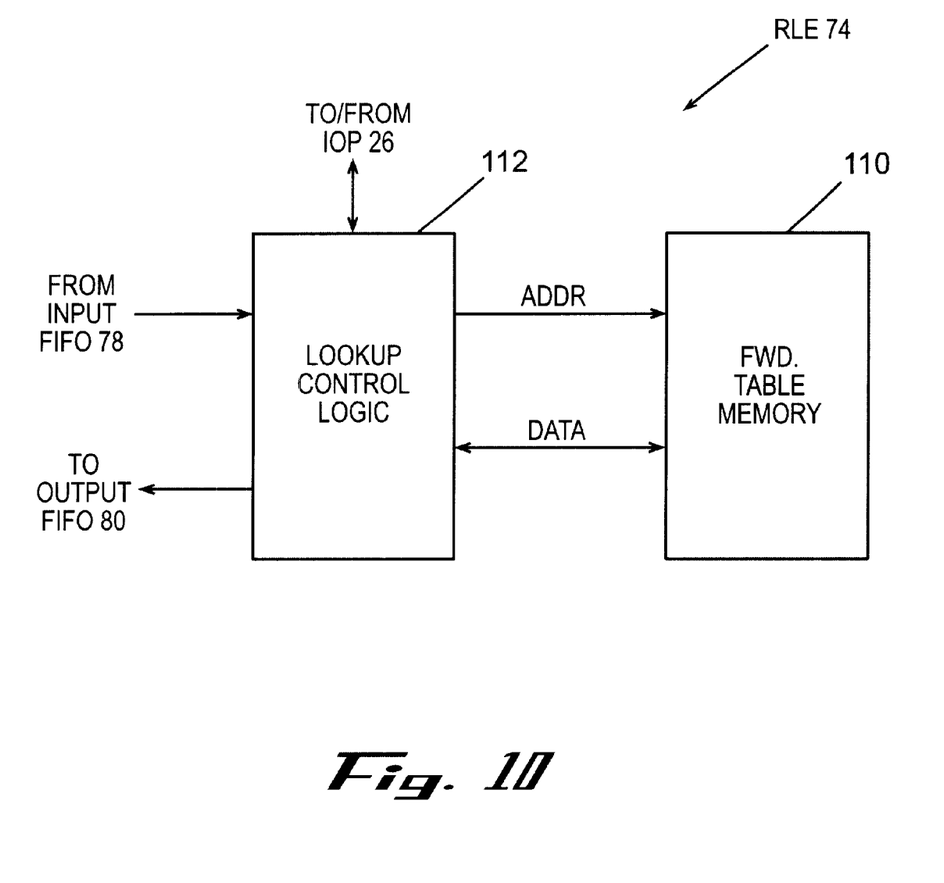
FIG. 10 is a block diagram of a route lookup engine (RLE) in the route and classification engine of FIG. 5.

FIG. 10 shows the structure of the route lookup engine (RLE) 74 of FIG. 5. A memory 110 is used to store forwarding tables provided by the IOP 26 of FIG. 2. Lookup control logic 112 controls the operation of the memory 110, and contains interfaces to the IOP 26, the RLE input FIFO 78 of FIG. 5, and the RLE output FIFO 80 of FIG. 5.

The RLE 74 is a hardware search engine used to determine a next-hop index for the forwarding processor 58 of FIG. 3. The RLE performs both unicast and multicast IP address lookups on IP networks, for example Virtual private Networks (VPNs) and the public Internet. Each IP network is assigned a root of a forwarding table in the memory 110 that is specific to that network.

Searching is performed first on the IP destination address (DA), and subsequently on the IP source address (SA) if the packet is multicast. This operation takes place automatically, and normally terminates when a next hop index is found, or the end of the search key (DA or SA) is reached without an index having been found. Various lookup algorithms may be used, including so-called Patricia tree algorithms. As shown in the description of the result above, a successful search returns a next hop pointer found in the forwarding table at a location corresponding to the search key (either DA or SA). The next hop pointer is a pointer into a pre-defined table of network addresses available to the forwarding processor 58 for creating forwarding envelopes for messages.

A submission and response architecture for packet route lookup and classification requests has been described. It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. Packet processing apparatus, comprising:

a request queue operative to receive lookup requests from a packet processor, each request including various information elements from a corresponding received packet and indicating that both a route lookup and a packet classification are to be performed based on the information elements contained in the request, the request queue having associated status information operative to indicate the number of empty entries therein;

a route lookup engine (RLE) having an RLE input queue and an RLE output queue, the RLE input queue being coupled to the request queue and being operative to receive selected information elements of requests from the request queue, the RLE being operative based on the selected information elements of each request to search for forwarding information indicating how the packet corresponding to the request should be forwarded, the RLE being operative to place the forwarding information into the RLE output queue upon completion of the search;

a packet classification engine (PCE) having a PCE input queue and a PCE output queue, the PCE input queue being coupled to the request queue and being operative to receive selected information elements of requests from the request queue, the PCE being operative based on the selected information elements of each request to perform a classification process and to generate classification information about the packet corresponding to the request, the PCE being operative to place the classification information into the PCE output queue upon completion of the classification process; and a result queue coupled to the RLE output queue and the PCE output queue, the result queue being operative to (i) receive the forwarding information and the classification information resulting from each request, (i) include the received forwarding information and classification information in a single result for each request, and (iii) provide each result to the packet processor in a corresponding communication transaction therewith.

2. Packet processing apparatus according to claim 1, wherein the PCE contains a rule memory including rule memory entries, each rule memory entry representing corresponding classification criteria applied in the classification process, and wherein the classification information included in each result includes an address of a rule memory entry whose corresponding classification criteria are satisfied by the request for which the result has been created.

3. Packet processing apparatus according to claim 1, wherein the set of information elements used by the PCE and the set of information elements used by the RLE overlap but are not identical.

4. Packet processing apparatus according to claim 3, wherein the overlapping information elements include a destination address from received packets.

5. Packet processing apparatus, comprising:
   a request queue operative to receive lookup requests from a packet processor, each request including various information elements from a corresponding received packet and indicating that both a route lookup and a packet classification are to be performed based on the information elements contained in the request, the request queue having an associated status information for indicating the number of empty entries therein;
   a route lookup engine (RLE) having an RLE input queue and an RLE output queue, the RLE input queue being coupled to the request queue and being operative to receive selected information elements of requests from the request queue, the RLE being operative based on the selected information elements of each request to search for forwarding information indicating how the packet corresponding to the request should be forwarded, the RLE being operative to place the forwarding information into the RLE output queue upon completion of the search;
   a packet classification engine (PCE) having a PCE input queue and a PCE output queue, the PCE input queue being coupled to the request queue and being operative to receive selected information elements of requests from the request queue, the PCE being operative based on the selected information elements of each request to perform a classification process and to generate classification information about the packet corresponding to the request, the PCE being operative to place the classification information into the PCE output queue upon completion of the classification process;
   a result queue coupled to the RLE output queue and the PCE output queue, the result queue being operative to (i) receive the forwarding information and the classification information resulting from each request, (ii) include the received forwarding information and classification information in a single result for each request, and (iii) provide each result to the packet processor in a corresponding communication transaction therewith, the result queue having an associated status information for indicating the number of empty entries therein; and
   a read logic, the read logic being operative to create a combined result and to provide the combined result to the packet processor as part of a single corresponding communication transaction therewith, wherein the combined result is created by combining a result from the result queue with the status information associated with the request queue and the result queue.

6. Packet processing apparatus according to claim 5, wherein the read logic is coupled to the packet processor via a bus, and wherein the combined result is provided to the packet processor as a multi-word block over multiple successive bus cycles.

7. Packet processing apparatus according to claim 6, wherein the combined result is a fixed size block including as many result entries as are available in the result queue at the time the result block is provided to the packet processor, and as many status entries as are necessary to pad the result block to its fixed size.

8. Packet processing apparatus according to claim 5, wherein the read logic is coupled to the packet processor via a bus, and further comprising additional queues also coupled to the packet processor via the bus, each additional queue having associated status information indicating the number of empty entries therein, and wherein the status information of the additional queues is also included in the combined result.

9. Packet processing apparatus according to claim 1, wherein the result queue having an associated status information operable to indicate the number of empty entries therein.

10. Packet processing apparatus according to claim 9, further comprising a read logic, the read logic being operative to create a combined result and to provide the combined result to the packet processor as part of a single corresponding communication transaction therewith, wherein the combined result is created by combining the status information of the result queue with a result from the result queue.

11. Packet processing apparatus according to claim 9, further comprising a read logic, the read logic being operative to create a combined result and to provide the combined result to the packet processor as part of a single corresponding communication transaction therewith, wherein the combined result is created by combining a result from the result queue with the status information of the result queue and the request queue.

12. Packet processing apparatus, comprising:
   a request queue operative to receive lookup requests from a packet processor, each request including various information elements from a corresponding received packet and indicating that both a route lookup and a packet classification are to be performed based on the information elements contained in the request, the request queue having a request queue associated status information for indicating the number of empty entries therein;
   a route lookup engine (RLE) having an RLE input queue and an RLE output queue, the RLE input queue being coupled to the request queue and being operative to receive selected information elements of requests from the request queue, the RLE being operative based on the selected information elements of each request to search for forwarding information indicating how the packet corresponding to the request should be forwarded, the RLE being operative to place the forwarding information into the RLE output queue upon completion of the search;
   a packet classification engine (PCE) having a PCE input queue and a PCE output queue, the PCE input queue being coupled to the request queue and being operative to receive selected information elements of requests from the request queue, the PCE being operative based on the selected information elements of each request to perform a classification process and to generate classification information about the packet corresponding to the request, the PCE being operative to place the classification information into the PCE output queue upon completion of the classification process;
   a result queue coupled to the RLE output queue and the PCE output queue, the result queue being operative to (i) receive the forwarding information and the classification information resulting from each request, (ii) include the received forwarding information and classification information in a single result for each request, and (iii) provide each result to the packet processor in a corresponding communication transaction therewith, the result queue having a result queue associated status information for indicating the number of empty entries therein; and a read logic, the read logic being coupled to the packet processor via a bus, operative to create a combined result and to provide the combined result to the packet processor as a multi-word block over multiple successive bus cycles, wherein the combined result is created by combining a result from the result queue and the status information associated with the request queue and the result queue.

13. Packet processing apparatus, comprising:

a request queue operative to receive lookup requests from a packet processor, each request including various information elements from a corresponding received packet and indicating that both a route lookup and a packet classification are to be performed based on the information elements contained in the request, the request queue having a request queue associated status information for indicating the number of empty entries therein;

a route lookup engine (RLE) having an RLE input queue and an RLE output queue, the RLE input queue being coupled to the request queue and being operative to receive selected information elements of requests from the request queue, the RLE being operative based on the selected information elements of each request to search for forwarding information indicating how the packet corresponding to the request should be forwarded, the RLE being operative to place the forwarding information into the RLE output queue upon completion of the search;

a packet classification engine (PCE) having a PCE input queue and a PCE output queue, the PCE input queue being coupled to the request queue and being operative to receive selected information elements of requests from the request queue, the PCE being operative based on the selected information elements of each request to perform a classification process and to generate classification information about the packet corresponding to the request, the PCE being operative to place the classification information into the PCE output queue upon completion of the classification process;

a result queue coupled to the RLE output queue and the PCE output queue, the result queue being operative to (i) receive the forwarding information and the classification information resulting from each request, (ii) include the received forwarding information and classification information in a single result for each request, and (iii) provide each result to the packet processor in a corresponding communication transaction therewith, the result queue having a result queue associated status information for indicating the number of empty entries therein; and a read logic, the read logic being coupled to the packet processor via a bus, operative to create a combined result and to provide the combined result to the packet processor as part of a single corresponding communication transaction therewith; and a plurality of additional queues coupled to the packet processor via the bus, each of the plurality of additional queues having associated status information indicating the number of empty entries therein, wherein the combined result is created by combining a result from the result queue with the status information of the plurality of additional queues, the request queues, and the result queue.

* * * * *